United States Patent Office 2,708,196
Patented May 10, 1955

2,708,196

CYCLIC PROCESS FOR THE PREPARATION OF ISOCINCHOMERONIC ACID AND NIACIN AND RECOVERY OF NIACIN

Robert S. Aries and Albert P. Sachs, New York, N. Y.; said Sachs assignor to said Aries No Drawing. Application December 27, 1951, Serial No. 263,710

10 Claims. (Cl. 260—295.5)

The present invention relates to the manufacture of nicotinic acid, also termed niacin, directly from 2,5-dialkyl-pyridines and more particularly from the commonly available 2-methyl-5-ethyl-pyridine.

It is well known that the 2,5-dialkyl-pyridines may be oxidized to the corresponding 2,5-pyridine-dicarboxylic acid (isocinchomeronic acid) by means of a suitable oxidizing agent of which nitric acid is most commonly used. Heretofore such oxidation has been carried out using high concentrations of nitric acid, e. g., 40% or higher, and at temperatures of 190–200° C. It is known further that the isocinchomeronic acid formed is decarboxylated by continued heating with a loss of one molecule of carbon dioxide from each molecule of isocinchomeronic acid to give niacin. At the temperature of about 190–200° C. necessary for this decarboxylation to be substantially complete, the reacting mixture containing isocinchomeronic acid, niacin and unconsumed nitric acid is extremely corrosive to the only commonly available material of construction equipment, viz., stainless steel. However, at somewhat lower temperatures, even 10 degrees lower, this reacting mixture, especially with a lower concentration of nitric acid, is distinctly less corrosive whle yielding less niacin.

It is therefore a principal object of our invention to provide an efficient process for converting dialkyl-pyridines to niacin in a single operation under conditions including the use of relatively dilute nitric acid which are compatible with substantially less corrosion of the reacting vessel and associated equipment, notwithstanding the fact that under such conditions the decarboxylation of isocinchomeronic acid to niacin is only partial.

A further object is to provide such a process in which the niacin produced may be readily separated from the undecarboxylated isocinchromeronic acid remaining in the system.

A still further object is to provide a cyclic process in which isocinchomeronic acid and niacin are separated substantially continuously from the stream of liquid components withdrawn from the reaction chamber and the recovered isocinchromeronic acid together with quantities of unspent nitric acid and other values are returned substantially continuously to the reaction chamber.

Other objects to be attained will be apparent as the description proceeds and the features of novelty of our invention will be pointed out in the appended claims.

Our invention is predicated in large part upon our discovery of an improved method of separating isocinchomeronic acid and niacin nitrate formed in reaction whereby the niacin nitrate may be thus readily removed from the system and the isocinchomeronic acid may be made available for further decarboxylation to niacin without substantial loss of either valuable material. Our invention is therefore best carried out as a cyclic continuous process (although substantial advantages will be realized even when it is carried out batchwise) wherein 2-methyl-5-ethyl-pyridine, for example, and dilute nitric acid are continuously passed to a reaction vessel, a portion of the reacting mixture continuously withdrawn with the separation in successive operations of isocinchomeronic acid and niacin nitrate, and the recovered isocinchomeronic acid and recovered nitric acid are returned to the reaction vessel. Thereby we achieve the usual attendant advantages of a continuous process, namely, better control, higher output and yields, lower labor costs, and simpler recycling of intermediate products.

In brief, our inmproved process further comprises subjecting the reaction products of oxidation of 2,5-dialkyl-pyridine obtained in the manner above described to cooling to a temperature range, e. g., 30 to 35° C. at which the isocinchomeronic acid may first be recovered by crystallization and repassed to the reaction chamber, after which the once-cooled mixture minus the isocinchomeronic acid is cooled further to a temperature range, e. g., from −5 to 5° C., at which niacin nitrate will precipitate out as crystals. The exhausted acid mother liquor fortified with fresh nitric acid is likewise used with fresh 2-methyl-5-ethyl-pyridine to carry out further oxidation. Thereby the usual sources of losses in chemical operations are avoided, with resultant high yields and low costs. The main reactions involved may be expressed as follows:

Upon heating the mixture of 2-methyl-5-ethyl-pyridine and nitric acid under superatmospheric pressures to a temperature range of from 180 to 185° C. and higher, the 2-methyl-5-ethyl-pyridine is oxidized to isocinchomeronic acid with the liberation of heat, thus:

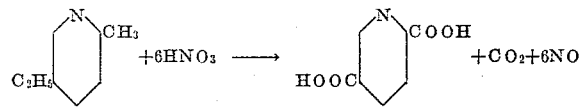

Then the isocinchomeronic acid formed is decarboxylated niacin, i. e.,

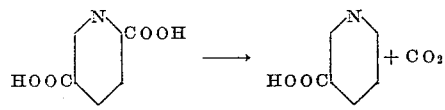

Our improved process will be best understood by reference to the following specific example of a continuous cyclic process for making niacin from 2-methyl-5-ethyl pyridine.

In this example, a stainless steel reactor or autoclave of 1000 gallon capacity of the usual type was used, having a dished top and bottom and a 5 ft. diameter with a wall thickness of ⅞ inch. It was tested to withstand a pressure of 500 pounds per square inch in order to be safe for operating pressures up to 250 pounds per square inch. This reactor was provided with a stirrer to agitate the charge and a shielded gas burner for heating up the charge initially. It was also provided with means of cooling for use during the reaction in the form of a device for spraying water over part of its surface. The reactor was supplied with the usual supply and discharge lines, safety devices, temperature, pressure, liquid level and other control devices and instruments, all as dictated by good chemical engineering practice.

The reaction mixture was first prepared in a separate container as follows: 2-methyl-5-ethyl-pyridine was mixed with 10% nitric acid in the proportion of substantially 7.3 moles of 100% equivalent nitric acid to 1 mole of 2-methyl-5-ethyl-pyridine, i. e., 38 parts of 10% nitric acid to one part of 2-methyl-5-ethyl-pyridine (in other runs the proportions were varied from 1 mole of 2-methyl-5-ethyl-pyridine to from 7 to 7.5 moles of 100% equivalent nitric acid and the concentration of the nitric acid varied from 10 to 15% with satisfactory results). 600 gallons of this charge heated to 70° C. (at which the reaction does not occur) was pumped into the reactor at the rate of 600 gallons per hour, one hour being the assumed residence time in the reactor, and after completing the charge heat was applied. The reaction commenced vigorously at 180–185° C. in the presence of the 10% nitric acid. The temperature rise was slow until this temperature range was reached whereupon a spontaneous rise took place necessitating cutting off of the heating and use of the cooling water to keep the temperature at substantially 185° C. and prevent it in any case from exceeding 190° C. A gaseous relief valve on the reactor was set to operate at pressures in excess of 250 lbs. per square inch and the formed gases were bled off comprising water vapor, carbon dioxide and nitric oxide. The reaction was assumed to be complete in one hour whereupon slightly before the expiration of this period continuous feed of fresh charge was begun with continuous discharge of liquid contents at such a rate that the liquid level remained constant. A convenient rate was found to be 2.5 gallons per minute. It may be noted that the composition of the new continuous charge differed from that of the starting charge in that the new charge contained 30% nitric acid and 2,5-methylethyl-pyridine in the ratio of 7 moles of nitric acid per mole of 2,5-methylethyl-pyridine. This higher concentration of nitric acid is necessary because the charge within the reactor has been depleted of much of its nitric acid content by reaction and is considerably less than 10% in nitric acid strength. Also the liquid discharge rate was somewhat less than the feed rate because of the fact that part of the charge was bled off as vapor and gases. The discharged liquid stream passed through a suitable cooling device in order to reduce it to the temperature range of 30–35° C. The gases separately bled off passed by means of a suitably valved stainless steel conduit to a nitric acid recovery system wherein the nitric oxide was reconverted to nitric acid at a strength of about 60% convenient for reuse in the oxidation of 2-methyl-5-ethyl-pyridine. It may be noted here that theoretically all the nitric acid converted to nitric oxide can thus be recovered and with properly designed equipment, the recovery may be 95% or even better. Not all of the nitric acid in the reaction mixture is ordinarily recoverable because the niacin is actually separated as niacin nitrate and the nitric acid thus combined with the niacin is not economically recoverable.

Thence the cooled discharge material or effluent was passed through a series of stainless steel crystallizing vessels, the combined capacity of which was equivalent to at least one day's full production or approximately 2500 gallons. Herein the charged effluent was allowed to rest for 24 hours at the temperature range mentioned, during which the isocinchomeronic acid present as the free acid was substantially completely precipitated, crystallization having been accelerated by seeding with the pure isocinchomeronic acid whereas the niacin present as niacin nitrate remained completely in solution. Following the 24 hour period the contents of the crystallizing tanks were filtered one after the other to remove crystallized isocinchomeronic acid. Since it was to be returned to the oxidation-decarboxylation system, it was not necessary to wash the crystals free of adhering dilute nitric acid and niacin-nitrate solution.

The mother liquor from the filtration of the isocinchomeronic acid containing dilute nitric acid and niacin nitrate dissolved therein was then fed to a second series of stainless steel crystallizing tanks, the combined capacity of which was likewise equivalent to a full day's production of niacin. In these vessels the solution was cooled to a temperature of from −5 to 0° C. but in no case above 5° C. whereby extensive precipitation of niacin nitrate was effected. Refrigerated brine was used as the coolant and precipitation was accelerated by seeding with niacin nitrate crystals. When precipitation was complete, the crystals of niacin nitrate were filtered off in a manner similar to the filtration of the isocinchomeronic acid. Again the crystals did not need to be washed since they were to be subjected to further refining. In other runs the crystals were washed with a limited amount of clear cold dilute nitric acid, thereby giving a purer product.

The mother liquor which would have included the washings, if any, from this operation contained nitric acid and some niacin and was used to make up a fresh charge as below described. The crystals of crude niacin nitrate were purified by dissolving in a small amount of water and adding enough strong caustic solution to yield a pH of about 8. De-colorizing carbon and filter aids were added, the solution filtered warm and the filter cake suitably washed. To the solution of sodium nicotinate thus formed, sulfuric acid was added to a pH of 3.5 and crystallization allowed to take place. Upon recrystallization, niacin of U. S. P. purity was obtained with an overall yield of approximately 80%. The mother liquor from this next to last crystallization still contained some niacin in addition to traces of isocinchomeronic acid together with substantial amounts of sodium nitrate and sodium sulfate. Preferably this niacin is recovered therefrom by known methods involving precipitation of the niacin as the copper salt, such methods not being part of the present invention.

The mother liquor from the final crystallization of the niacin of U. S. P. purity still containing important values was used to dissolve the crude niacin nitrate as above described.

Substantially all value of the improved process have now been recovered except those in the mother liquor or nitric acid solution remaining after the removal by crystallization of the isocinchomeronic acid and niacin nitrate. The mother liquor thus contains nitric acid, water, and small amounts of valuable organic acids. To this was added the nitric acid recovered from the reaction chamber and the final mixture assayed for its nitric acid content and this content brought to the correct value of 30% by adding 100% nitric acid in order to prevent dilution. The mixture so constituted was then suitable for mixing with 2-methyl-5-ethyl-pyridine and recovered isocinchomeronic acid for charging to the reactor. In certain cases as below set forth, only part of the mother liquor is thus recycled and the remainder is used for the recovery of its niacin and isocinchomeronic acid content by way of the copper salt.

It will be seen from the foregoing that a completely cyclic process is had in which at the inflow end a solution or mixture of 2-methyl-5-ethyl-pyridine, nitric acid and isocinchomeronic acid is supplied; the outflow consists of two streams, one a mixture of gases and vapors containing nitric acid recoverable in known manner as nitric acid for re-use, the other a liquid stream consisting of a dilute nitric acid solution of isocinchomeronic acid and niacin nitrate which are recovered separately, the isocinchomeronic acid being recycled and the niacin nitrate being converted to niacin and refined. Finally the residual nitric acid solution is fortified with stronger nitric acid and re-used as part of the feed to the oxidation-decarboxylation reactor. By the use of the improved process, a reaction temperature may be used which is conducive to a relatively low rate of corrosion on the stainless steel equipment. Furthermore, the ratio of isocinchomeronic acid production to niacin is constant so that once the system has reached a steady state all the fresh 2-methyl-5-ethyl-pyridine oxidized appears at the outflow as niacin and a constant inventory of isocinchomeronic acid circulates through the system.

A further important advantage arises from the step which is employed to separate niacin from the isocinchomeronic acid since thereby the long and costly process for separation heretofore employed is avoided with no loss of either substance. Further, the niacin is obtained practically quantitatively in a form suitable for further refinement by simple means.

It will be obvious that the practical working out of the invention is susceptible to considerable variation. For example, the mother liquor to be recirculated remaining after the isocinchomeronic acid and niacin nitrate have been removed may be found to contain somewhat more water than is compatible with maintaining a constant amount of water in the reactor. In the specific example above given, the excess water in the mother liquor was compensated for by the addition of 100% nitric acid. However, other steps may be employed to keep the amount of water returned to the system to the correct value, it being noted that 6 moles of water are formed in the reaction per mole of 2-methyl-5-ethyl-pyridine started with. In one way of proceeding, air may be pumped continuously into the reactor. Beside aiding in the oxidation, the contained inert nitrogen which must be bled from the system will carry with it a corresponding amount of water vapor, thus reducing the water content of the system. While this procedure has the advantage of cutting down on the amount of nitric acid required, it has the disadvantage of requiring additional equipment in the form of a compressor. It also causes greater liberation of heat in the reaction zone which must be dissipated and also results in diluting substantially the effluent gases passed to the nitric acid recovery system. A further procedure consists in removing a portion of the mother liquor from the cycle and recovering its niacin content by the known copper recovery method. In normal operation of the process without the addition of air, it has been found that the removal of 20% of the total production of mother liquor is sufficient to compensate for the normal increase in the water content of the system. Finally, part of the water may be removed by evaporation, preferably in a stainless steel still with a column of not very high fractionating power at about 80° C. Under moderate vacuum, 20% of the total water content can be very easily removed.

The invention has been illustrated as applied to a continuous process. It can, however, be practically embodied in an improved batch process in which the product of the reactor is cooled to 30–35° to cause crystallization of isocinchomeronic acid which is separated as described, after which the batch is then cooled to about 0° C. to cause crystallization and precipitation of niacin nitrate which is separated and refined as already described, and the final mother liquor used with nitric acid, recovered isocinchomeronic acid, and 2-methyl-5-ethyl-pyridine to make up a new batch.

It is well known that in general alkyl groups attached to the pyridine nucleus in the 2,5-positions are both oxidized by nitric acid to carboxyl groups to give isocinchomeronic acid.

We claim:

1. In the manufacture of niacin from 2-methyl-5-ethyl-pyridine, the continuous process which comprises the steps of conducting a mixture of 2-methyl-5-ethyl-pyridine, isocinchomeronic acid and nitric acid to a reaction zone, maintaining therein a temperature not substantially above the range of 180–185° C. at which said 2-methyl-5-ethyl-pyridine is converted at least in part to isocinchomeronic acid and said isocinchomeronic acid is partially decarboxylated to niacin, conducting a stream of liquid reaction products away from said zone, separating from said stream of products by fractional crystallization isocinchomeronic acid and niacin nitrate contained therein and returning said isocinchomeronic acid to said reaction zone and maintaining therein a substantially constant inventory of isocinchomeronic acid and adding thereto fresh quantities of nitric acid.

2. The process according to claim 1 in which the concentration of nitric acid in the reaction zone is maintained at approximately 4–10%.

3. The process according to claim 1 including the steps of taking off from said zone a stream of gaseous products containing nitric oxide, recovering said nitric oxide as nitric acid, and returning the same to said reaction zone.

4. The process according to claim 1 in which said stream of products conducted from the reaction zone is first cooled to the range of from 30–35° C.

5. The process according to claim 4 in which after removal of the insoluble isocinchomeronic acid said stream is cooled to within —5° to 5° C. at which to separate insoluble niacin nitrate.

6. The method of making niacin in which a substituted pyridine having the formula

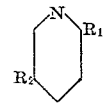

wherein $R_1$ and $R_2$ are alkyl groups having not more than two carbon atoms, is reacted in liquid phase with dilute nitric acid in a reaction zone at reaction temperatures not exceeding 190° C. to form a mixture of isocinchomeronic acid and niacin, characterized by the steps of conducting an aqueous stream of reaction products from the reaction zone, cooling the same to precipitate isocinchomeronic acid while leaving substantially all of the niacin nitrate in solution, separating the precipitated isocinchomeronic acid from the mother liquor and returning said isocinchomeronic acid to the reaction zone together with fresh quantities of nitric acid, further cooling the mother liquor to precipitate niacin nitrate and recovering same.

7. The method of making niacin in which 2-methyl-5-ethyl pyridine is reacted in the liquid phase with dilute nitric acid in a reaction zone at reaction temperatures to form a mixture of isocinchomeronic acid and niacin, characterized by the steps of conducting a stream of reaction products from the reaction zone, cooling the same to within the approximate range of 30–35° C. and holding said temperature to precipitate isocinchomeronic acid while leaving substantially all of the niacin nitrate in the solution, separating the precipitated isocinchomeronic acid from the mother liquor and returning said isocinchomeronic acid to the reaction zone, further cooling the mother liquor to within the approximate range of —5° C. to +5° C. to precipitate niacin nitrate and recovering same.

8. The method of making niacin in which 2-methyl-5-ethyl pyridine is reacted in the liquid phase with dilute nitric acid in a reaction zone at reaction temperatures to form a mixture of isocinchomeronic acid and niacin, characterized by the steps of conducting a stream of reaction products from the reaction zone, cooling the same to precipitate isocinchomeronic acid while leaving substantially all of the niacin nitrate in the solution, separating the precipitated isocinchomeronic acid from the mother liquor and returning said isocinchomeronic acid to the reaction zone, further cooling the mother liquor to precipitate niacin nitrate and recovering same and returning nitric acid in said mother liquor to the reaction zone, while reducing the water content of the materials returned to the reaction zone to compensate for the gain in water of reaction in said zone.

9. The method according to claim 8 including the further step of adding air to the reaction zone.

10. The method of making niacin in which 2-methyl-5-ethyl pyridine is reacted in the liquid phase with dilute nitric acid in a reaction zone at reaction temperatures to form a mixture of isocinchomeronic acid and niacin, characterized by the steps of conducting an aqueous stream of reaction products from the reaction zone, cooling the same to precipitate isocinchomeronic acid while leaving substantially all of the niacin nitrate in solution, separating the precipitated isocinchomeronic acid from the mother liquor and returning said isocinchomeronic acid to the reaction zone together with fresh quantities of nitric acid, further cooling the mother liquor to precipitate niacin nitrate and recovering same, and maintaining in said reaction zone a molar ratio of nitric acid to 2-methyl-5-ethyl pyridine in the approximate range of 7 to 1 to 7.5 to 1.

References Cited in the file of this patent

UNITED STATES PATENTS

| | | |
|---|---|---|
| 2,389,065 | Lee et al. | Nov. 13, 1945 |
| 2,447,234 | Dean et al. | Aug. 17, 1948 |
| 2,524,957 | Burrows et al. | Oct. 10, 1950 |

FOREIGN PATENTS

| | | |
|---|---|---|
| 234,588 | Switzerland | Feb. 1, 1945 |

OTHER REFERENCES

Elderfield, "Heterocyclic Compounds," vol. 1, page 570 (1950).

Maier-Bode et al., "Pyridin Und Seine Derevate" (1934), p. 236.